Sept. 28, 1965    R. F. HAYS, JR    3,208,277
ANGLE OF ATTACK INDICATING SYSTEM
Filed Oct. 14, 1960
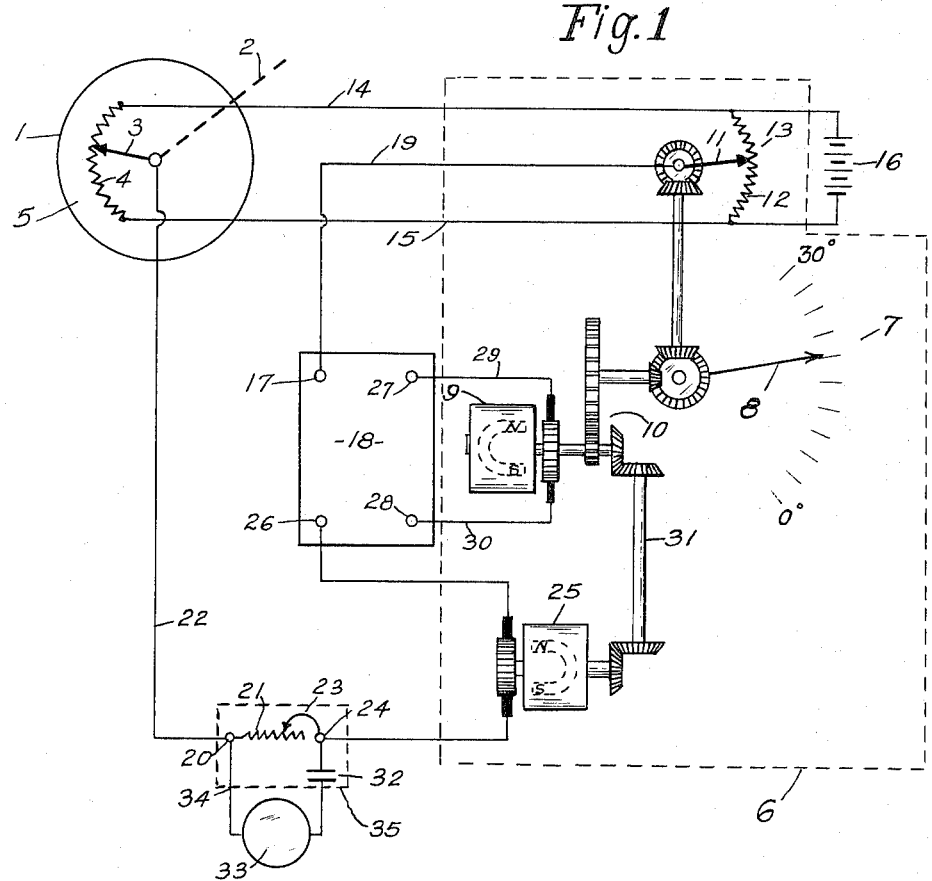
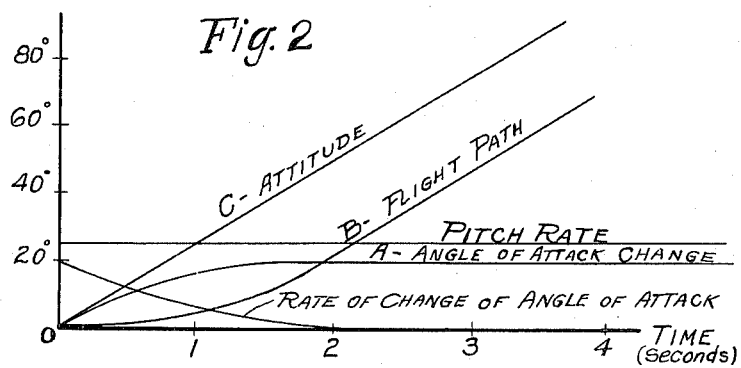
INVENTOR.
Robert F. Hays, Jr.

United States Patent Office 3,208,277
Patented Sept. 28, 1965

3,208,277
ANGLE OF ATTACK INDICATING SYSTEM
Robert Fred Hays, Jr., Charlottesville, Va., assignor to Specialties, Incorporated, Syosset, N.Y.
Filed Oct. 14, 1960, Ser. No. 62,646
5 Claims. (Cl. 73—180)

This invention relates to angle of attack indicators for aircraft.

Instruments for indicating angle of attack are known but prior devices of this kind have had serious deficiencies in that the pointer or other indicating means usually lagged behind the actual movements of the aircraft. The lag resulted from damping of the indicator. The damping has proved to be necessary to attenuate erratic swings of the pointer which otherwise would result from momentary variations in angle of attack caused by air turbulence. Such erratic swinging of the pointer, if permitted, would cause uncertainty and confusion relative to the average value of angle of attack. The lag in damped angle of attack indicators is particularly serious on takeoff and landing where the angle of attack may be changed rapidly under the control of the pilot.

It is therefore an object of the present invention to provide an angle of attack indicator which is relatively immune to the effects of air turbulence and which will promptly and accurately indicate any change in angle of attack resulting from a change in the pitch attitude of the aircraft.

An additional object is to provide an angle of attack indicating system which can be constructed from available commercial units.

Other objects will be evident in the following description.

In the drawings:

FIGURE 1 is a diagram of circuits and components of my improved angle of attack indicator.

FIGURE 2 is a curve showing the relationship of angle of attack, flight path, attitude and rate of change of angle of attack with respect to time.

In FIGURE 1, the unit 1 is an air stream direction detector, commonly abbreviated as A.D.D. This device may be of any suitable design but the preferred type has a wind vane or arm 2, indicated diagrammatically, and connected to wiper 3 to move this wiper over resistor 4 of potentiometer 5 included in the instrument 1. The friction of wiper 3 on the resistor should be very light so that vane 2 will easily take up its proper position in the air stream. The indicator is shown in box 6 which may represent the casing of the indicator attached to the instrument panel. This box contains scale 7 and associated pointer 8 which is rotated by direct current motor 9 through suitable step down gearing. This motor preferably has a permanent magnet field. The maximum voltage applied to the motor may vary but in practice a 28 volt motor has been found to be satisfactory.

The motor gear system indicated generally by the numeral 10 is also geared to wiper 11 of potentiometer 13. The wiper 11 is therefore rotated about its axis in predetermined angular relationship to pointer 8. The ratio of angular movement of elements 8 and 11 may be 1:1 if desired. The ends of resistor 4 are connected to the ends of resistor 12 by means of conductors 14 and 15 and the positive and negative terminals of battery, generator, or other current source 16 are connected, respectively, to conductors 14 and 15. The wiper 11 is electrically connected to input terminal 17 of direct current amplifier 18 by means of conductor 19 and wiper 3 is electrically connected to terminal 20 of variable resistor 21 by means of conductor 22. The slide 23 of variable resistor 21 is connected to terminal 24 which is connected to a terminal of permanent magnet D.C. rate generator 25, the other terminal of which is connected to the remaining input terminal 26 of amplifier 18. The output terminals 27 and 28 are connected to the terminals of motor 9 by means of conductors 29 and 30. The shaft of motor 9 is arranged to rotate the shaft of rate generator 25 by means of suitable gearing and connecting shaft 31.

Capacitor 32 is connected between terminal 24 and a terminal of rate gyro unit 33 which generates a D.C. voltage proportional to the angular rate of movement of the carrying aircraft about the pitch axis. The other terminal of unit 33 is connected to terminal 20 by means of conductor 34. Rate gyros of this type are known and so it will be indicated in diagrammatic form, as are some of the other known units. The gyro unit 33 is so constructed and mounted that it produces a D.C. voltage of one polarity when the pitch of the aircraft is in one direction and of opposite polarity when the pitch is in opposite direction.

I do not wish to be limited to any particular values of components but in practice the resistor 4 can have a value of 2000 ohms and resistor 12 can be of 600 ohms resistance. The resistor 21 may have a resistance of 100,000 ohms and element 32 may have a capacitance of 20 microfarads. The generators may be chosen to produce maximum voltages of 28 volts or otherwise, according to the voltage of unit 16 and other factors. The scale 7 shows angle of attack varying from 0 to 30°.

The voltage output of rate generator 25 bucks the voltage of the error signals from the potentiometers and this is true regardless of the relative potentials of the wipers since it will be observed that the direction of rotation of motor 9 and mechanically connected rate generator 25 will be reversed when the direction of current flow through amplifier input conductors 19 and 22 is reversed.

The generated voltage of the D.C. generator 25 is a linear function of speed of rotation. When an error signal between the wipers of the potentiometers or a voltage across resistor 21 causes the motor to run, the resulting generated voltage from generator 25 opposes such signals. The small difference between these signals and the generated voltage is tremendously amplified by amplifier 18 and applied to the motor 9. Thus the motor very quickly accelerates to a speed such that the generated voltage of generator 25 is very nearly equal and opposite to the algebraic sum of the error signal between the potentiometer wipers 3 and 11, and the voltage across resistor 21. Therefore pointer 8 runs at a speed which is proportional to the voltage between terminals 17 and 24 which is the algebraic sum of the error voltage between the potentiometer wipers and the voltage across resistor 21. In this way the wiper 11 and connected pointer 8 are rapidly moved for a large net voltage between terminals 17 and 24 and are more slowly moved for small signals. The result is that there is no overshoot and no oscillation about the balanced state.

My invention comprises the addition of rate gyroscope 33 and the associated units 20, 21, 23, 24, and 32, connected in circuit as indicated. It is desired to provide a smoothed or damped follow-up of pointer 8 relative to movements of vane 2 without over-correction or oscillations so that erratic deviations of vane position resulting from air turbulence will cause no applicable movement of pointer 8. At the same time it is desired to have the pointer follow immediately any variations of angle of attack due to pitching of the aircraft about the pitch axis. Therefore the rate gyroscope device 33 is aligned with its sensitive axis parallel with the pitch axis of the aircraft and precessional movements produced by pitching of the aircraft cause the generation of D.C. voltages across the output of the gyro unit proportional to the angular rate of pitch. Normally, the potential differences produced by the potentiometers and rate generator 25 are balanced as previously described. The polarity of rate gyroscope unit 33 is chosen so that the pointer 8 will be displaced in the desired direction corresponding to a given direction of pitch.

If the speed of an aircraft is held approximately constant and an angular rate is introduced on the pitch axis of the aircraft, the angle of attack will change with an initial rate of change equal the pitch rate of the aircraft but this rate of change of angle of attack will decrease as the flight path of the aircraft begins to change. The rate of change of angle of attack will decrease and will approach zero as the rate of change of the flight path angle approaches the pitch rate. When resistor 21 and capacitor 32 are connected to the rate gyro as shown in FIGURE 1 the D.C. voltage generated by the rate gyro, as the result of pitch rate, will initially appear across resistor 21 but this voltage across element 21 will decrease and will approach zero as the capacitor 32 charges. The voltage across resistor 21 will be proportional to the change of angle of attack provided resistor 21, capacitor 32, and the voltage from the rate gyro are properly related to aerodynamic characteristics of the aircraft. Thus the voltage across resistor 21 being applied to the input circuit of the indicator will cause the pointer to move at a rate equal to the rate of change of angle of attack without an error signal between the potentiometer wipers 3 and 11 being required. Therefore, when the angle of attack changes because of angular motion of the aircraft about its pitch axis, the indicator will show the change without delay.

My novel additional means makes it possible to smooth or damp out most of the effect of air turbulence without delaying the indication of any change in angle of attack resulting from angular motion of the aircraft about its pitch axis.

In operation, the instruments 1 and 33 are properly attached to the aircraft, the element 2 being in position to be aligned by the outside air stream rushing past it. The instrument in box or housing 6 is attached to the instrument panel. The components are so chosen and arranged that wiper 11 will follow proportionally movements of wiper 3 which is rotated by means of wind directed vane or other member 2. Because of the damping action of rate generator 25, as previously described, the wiper 11 will lag considerably behind wiper 3 and the greater the rate of rotation of wiper 3 the greater the lag. Consequently the position of pointer 8 indicates the average value of angle of attack and the pointer position is relatively undisturbed by erratic deviations of angle of attack from the average value such as would be caused by flying through a turbulent air mass.

The attitude of the aircraft about the pitch axis is under the control of the pilot and is relatively unaffected by air turbulence. If the pilot introduces a pitch rate in order to change the flight path of the aircraft, the angle of attack will change in response to the pitch rate. The voltage across resistor 21 responds to the pitch rate signal from rate gyro 33 in the same manner in which the rate of change of angle of attack responds to pitch rate of the aircraft. Pointer 8 is rotated by motor 9 at a rate proportional to the voltage across resistor 21 such that the pointer position at all times corresponds to the angle of attack of the aircraft. Thus the erratic effect of air turbulence upon indicated angle of attack is highly attenuated but there is no delay in the indication of a change in angle of attack resulting from angular motion of the aircraft about its pitch axis.

I have described a rate gyroscope controlling a direct current generator for supplying additional electrical information to the angle of attack indicator to prevent lag in the indication of changes in angle of attack resulting from changes in attitude while retaining the feature of smoothing the indication of erratic variations resulting from air turbulence. The additional information may also be obtained from the pitch axis of a gyro horizon, an angular accelerometer on the pitch axis, a signal pickoff on the elevator as well as a rate gyro on the pitch axis of the aircraft; or any combination of these devices.

It is preferable that the time constant between the actuation of the air stream direction detector and indicator for angle of attack shall be between one half second to one second. A time constant of less than one half second results in insufficient smoothing of the information. A time constant greater than approximately one second provides more smoothing than the pilot needs and unnecessarily delays the presentation of the information.

My angle of attack indicating system as described thus far indicates the smoothed or average angle of attack without introducing any delay in the response to an angle of attack change resulting from angular motion of the aircraft about the pitch axis. An additional advantage of my system is that by proper design of the equalizer circuit 35, the indicator can be made to anticipate the angle of attack of the aircraft. For certain operations it is desirable to control the angle of attack very closely by means of the elevator and by visual reference to the angle of attack indicator.

When the indicator is made to anticipate the angle of attack of the aircraft, the angle of attack can be controlled more accurately, with better stability and with more ease and assurance on the part of the pilot. By reference to FIGURE 2 it can be seen that the angle of attack of an aircraft changes as the result of pitch rate but the angle of attack lags behind pitch rate in time. The angle of attack of the aircraft lags behind pitch rate in a manner similar to a damped indicator lagging behind an air stream direction detector. Therefore, if the signal supplied by circuit 35 is made greater than the value required to prevent the indicator lagging behind the A.D.D., when the aircraft rotates about the pitch axis, the indicator will lead the A.D.D. and will anticipate the angle of attack of the aircraft. The anticipation may be partial or complete depending upon the amplitude of the signal supplied by circuit 35. If the anticipation is complete, the introduction of an angular rate about the pitch axis of the aircraft will result in the indicator pointer 8 moving immediately to the position on the scale 7 corresponding to the angle of attack which will eventually be reached by the aircraft if the pitch rate is maintained.

Various types of indicators may be used, having various dynamic response characteristics relative to the signal applied to the indicator. Various devices may be used, separately, or in combination, as component 33 which would have various dynamic response characteristics relative to angular motion of the aircraft about the pitch axis. In order to have the indicator show the correct angle of attack without delay or to anticipate the angle of attack, which ever is required, it is only necessary to construct assembly 35 so that it will have the dynamic characteristic that is necessary to match the dynamic characteristic of sensor assembly 33 to that of indicating assembly 6 so that the combination of the four assemblies comprising the system; that is, assemblies 1, 33, 35, and 6, will have the desired dynamic response.

What I claim is:

1. In an aircraft instrument system, means for determining angle of attack of the aircraft carrying said system, means operatively connected with said determining means for indicating angle of attack, means connected with said angle of attack determining and indicating means for damping indications thereof, and means responsive to rate of movement of said aircraft about its pitch axis and connected with said determining and indicating means for reducing the damping effect of said damping means for changes of angle of attack resulting from movement of said aircraft about its pitch axis.

2. The aircraft instrument system as described in claim 1, said means for determining angle of attack including means responsive to air flow relative to said aircraft.

3. In an aircraft instrument system, means for determining angle of attack of the aircraft carrying said system, means operatively connected with said determining means for indicating angle of attack, means connected with said angle of attack determining and indicating means for damping indications thereof, and means responsive to rate of movement of said aircraft about its pitch axis and connected with said determining and indicating means for reducing the damping effect of said damping means for changes of angle of attack resulting from movement of said aircraft about its pitch axis, said damping means including a rate generator connected so that its output opposes the output of said angle of attack determining means.

4. The aircraft system as described in claim 3, said means for determining angle of attack including means producing an electrical output, said rate generator producing an electrical output proportional to rate of change of indicated angle of attack and connected so that its electrical output opposes the electrical output of said angle of attack determining means.

5. The aircraft instrument system as described in claim 4, said responsive means comprising a resistor and a series-connected capacitor and pitch rate gyroscope-controlled generator connected in parallel with said resistor.

References Cited by the Examiner
UNITED STATES PATENTS

| | | | |
|---|---|---|---|
| 2,856,772 | 10/58 | Strihafka | 73—179 |
| 2,875,965 | 4/59 | Anderson et al. | 73—180 |
| 2,985,410 | 5/61 | Richter et al. | 244—77 |
| 3,033,496 | 5/62 | Brands | 244—77 |

LOUIS R. PRINCE, *Primary Examiner.*

ISAAC LISANN, *Examiner.*